United States Patent [19]
Sunshine et al.

[11] Patent Number: 5,774,598
[45] Date of Patent: Jun. 30, 1998

[54] SYSTEM AND METHOD FOR SAMPLE RATE CONVERSION OF AN IMAGE USING DISCRETE COSINE TRANSFORMS

[75] Inventors: Lon E. Sunshine, Boston; Michael L. Reisch, Carlisle; Munib A. Wober, Haverhill, all of Mass.

[73] Assignee: Polaroid Corporation, Cambridge, Mass.

[21] Appl. No.: 440,631

[22] Filed: May 15, 1995

Related U.S. Application Data

[63] Continuation-in-part of Ser. No. 159,795, Nov. 30, 1993, abandoned.
[51] Int. Cl.[6] .............................. G06K 9/36; G06K 9/46
[52] U.S. Cl. ...................... 382/250; 382/232; 382/250; 348/384; 358/432; 375/222
[58] Field of Search .................................. 382/232, 250; 358/432; 348/384; 375/222

[56] References Cited

U.S. PATENT DOCUMENTS

| | | | |
|---|---|---|---|
| 5,168,375 | 12/1992 | Reisch et al. | 358/432 |
| 5,199,046 | 3/1993 | Ling | 375/222 |
| 5,534,925 | 7/1996 | Zhong | 348/384 |

FOREIGN PATENT DOCUMENTS

| | | | |
|---|---|---|---|
| 0465250 | 8/1992 | European Pat. Off. | G06F 15/72 |

OTHER PUBLICATIONS

"Interpolation Using the Discrete Cosine Transform"; Agbinya; Electronics Letters 24 Sep. 1992, vol. 28, No. 20.

*Primary Examiner*—Leo Boudreau
*Assistant Examiner*—Daniel G. Mariam
*Attorney, Agent, or Firm*—Robert A. Sabourin

[57] ABSTRACT

An image processing system for sample rate conversion of an image signal representing an image of pixels from a first sample rate to a second sample rate includes: an image acquisition device for acquiring the image signal from an image signal source at the first sample rate; a first memory for buffering the input signal; a second memory for storing predetermined discrete cosine transform coefficients; a dot product multiplier for multiplying the image signal retrieved from the first memory times the predetermined coefficients to produce an output signal at the second sampling rate; a third memory for buffering the output signal; control sequencer logic for controlling operation of the image processing system; and an output device for providing a resampled image at the second sampling rate from the output signal. The image processing system facilitates sample rate conversion by segmenting the image into segments of image data points wherein a separate and different offset is determined for each segment. A discrete cosine transform is performed on each segment of image data points to generate corresponding DCT coefficients. Thereafter, resampled image data points are generated by taking a modified IDCT of the DCT coefficients using a modified IDCT basis matrix which is dependent upon a sampling rate conversion ratio and/or an offset.

7 Claims, 13 Drawing Sheets

SYSTEM AND METHOD FOR SAMPLE RATE CONVERSION OF AN IMAGE USING DISCRETE COSINE TRANSFORMS

RELATED APPLICATIONS

This application is a continuation-in-part of U.S. patent application Ser. No. 08/159,795 filed 30 Nov. 1993 by Munib A. Wober and Michael L. Reisch, now abandoned. Furthermore, this application is related to concurrently filed and commonly assigned U.S. patent applications, Ser. No. 08/440,666, and U.S. Pat. Nos. 5,719,958, 5,737,450, 5,729,631, 5,748,770, 5,694,484 and 5,629,778.

BACKGROUND OF THE INVENTION

1. Field of the Invention

The invention relates generally to an improved image processing system and methods for use with this system. More particularly, the invention relates to a system and methods thereto for resampling an image at a different sampling rate.

2. Description of the Prior Art

Images can be thought of as two-dimensional representations of some visual reality that is distributed in space and/or time. Ordinarily, images are what the human visual system perceives as variations in external stimuli such as brightness, color, and sometimes depth cues. While over the years many techniques have been developed to capture and reproduce images, their representation as continuous, discrete, or digital signals which can be manipulated, processed or displayed through the use of computers or other special purpose electronic hardware is the most recent technique. Now well-established, this latest technique has a variety of beneficial applications. For instance, while in electronic form, images can be enhanced to create special visual effects, restored, coded for transmission to distant locations, stored in memory (such as on CDROM, DAT, floppy disks, etc.), reconstructed, displayed, or converted to some other tangible form.

Image processing can occur in either the spatial domain or the frequency domain. An image is said to reside in the spatial domain when the values of the parameters used to describe it, such as brightness, have a direct correspondence with spatial location. In the frequency domain, the image of the spatial domain may be represented by a series of frequency components in the form of trigonometric functions which, when summed for each image data point (i.e., pixel) of the spatial domain, yield the value of the parameter used to characterize the image of that particular image data point in the spatial domain, and such a representation may be extended to cover all image data points of an image.

In the spatial domain, original image data may be represented as a continuous function of spatial position, designated $s_c(y,x)$ for the two-dimensional case. For most applications it is acceptable, as well as advantageous, to sample this continuous-space image along the horizontal and vertical directions at $x=iT_h$ and $y=jT_v$ where i and j are integer indices and $T_h$ and $T_v$ are the horizontal and vertical sampling periods, respectively. This yields a matrix of points, $s_c(jT_v,iT_h)$ which shall be identified henceforth with the discrete signal designated as s(j,i) for the two-dimensional case where the lower case, s, designates the spatial domain, i is the index of rows, j is the index of columns, and i and j can be initialized to start at zero. In the frequency domain, matrices can also be used to mathematically describe an image as a set of transform coefficients (also referred to as frequency coefficients) which represent frequency data in a transform matrix conventionally designated, S(v,u), where the upper case, S, designates the frequency domain, u is the index of rows and v is the index of columns.

Spatial image data points may be transformed to the frequency domain using transformations such as Fourier transforms or discrete cosine transforms. The use of discrete cosine transforms and inverse discrete cosine transforms for image compression is well known in the art and, in fact, the practice has been adopted as standard in industry by The Joint Photographic Experts Group (JPEG) and the Motion Picture Experts Group (MPEG), which were created as part of a joint effort of the Consultative Committee on International Telegraphy and Telephony (CCITT) and The International Standards Organization (ISO).

When a discrete even cosine transformation (hereinafter DCT) is used, the frequency domain is referred to as the DCT domain and the frequency coefficients are referred to as DCT coefficients. Conventionally, transforming data from the spatial domain to the frequency domain is referred to as a forward transformation, whereas transforming data from the frequency domain to the spatial domain is referred to as an inverse transformation. Hence, a forward discrete cosine transformation is defined as a transform that maps an image from the original image data points s(j,i) in the spatial domain to DCT coefficients S(v,u) in the DCT domain according to the basis function of the forward DCT, whereas an inverse discrete even cosine transformation (or IDCT) is defined as a transform that maps the DCT coefficients S(v,u) from the DCT domain to reconstructed image data points $\hat{s}(j,i)$ in the spatial domain according to the basis function of the IDCT.

Processing an electronically acquired image in an image processing system sometimes includes sample rate conversion, i.e. resampling, of the sample rate of the original image. When an image is resampled, either the resolution or the sizing of the image is altered.

The primary object of the current invention is to provide a system for sample rate conversion of an image which is more efficient than existing systems and which is complementary to international compression standards such as ISO/IEC 10918-1, Section A.3.3 set by the International Organization of Standards, Joint Photographic Experts Group and similar standards recognized by the Motion Picture Experts Group. Other objects of the invention will, in part, appear hereinafter and, in part, be obvious when the following detailed description is read in conjunction with the drawings.

SUMMARY OF THE INVENTION

An image processing system for sample rate conversion of an image signal representing an image of pixels from a first sample rate to a second sample rate includes: an image acquisition device for acquiring the image signal from an image signal source at the first sample rate; a first memory for buffering the image signal; a second memory for storing predetermined discrete cosine transform coefficients; a dot product multiplier for multiplying the image signal times the predetermined coefficients to produce an output signal at the second resampling rate; a third memory for buffering the output signal; control sequencer logic for controlling operation of the image processing system; and an output device for providing a resampled image from the output signal at the second sampling rate.

The image processing system according to the invention facilitates sample rate conversion by segmenting the image into segments of image data points wherein a separate and different offset is determined for each segment. A discrete cosine transform is performed on each segment of image data points to generate corresponding DCT coefficients. Thereafter, resampled image data points are generated by taking a modified IDCT of the DCT coefficients using a modified IDCT basis matrix which is dependent upon a sampling rate conversion ratio and/or an offset.

BRIEF DESCRIPTION OF THE DRAWINGS

The aforementioned aspects and other features of the invention are described in detail in conjunction with the accompanying drawings in which the same reference numerals are used throughout for denoting corresponding elements and wherein.

DETAILED DESCRIPTION OF THE PREFERRED EMBODIMENTS

Figure 1:
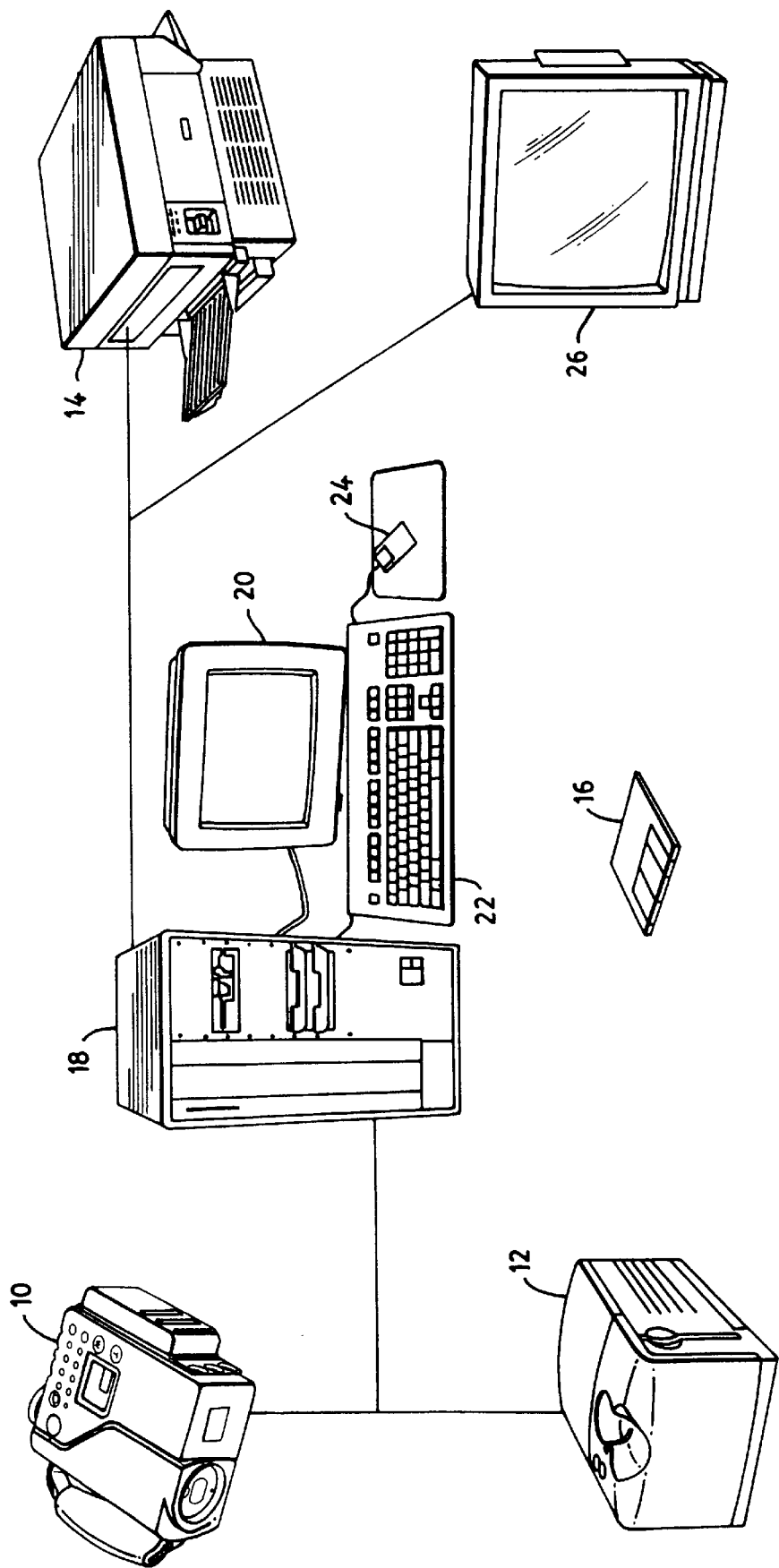
FIG. 1 is a block diagram of an electronic imaging system according to the invention.

The present invention relates to an image processing system and associated image processing methods for resampling an image of a scene. FIG. 1 illustrates one exemplary embodiment of such a system. As can be seen, FIG. 1 illustrates an electronic image processing system where an image signal source, such as camera 10 or a scanner 12, provides an electronic image signal which represents an image of the subject (not shown). A computer 18 receives the electronic signal from the image signal source and thereafter processes the image signal electronically to provide any number of known image processing functions such as resizing, sharpening, noise removal, reflection or edge detection. The processed image can be transmitted, i.e. output, to any destination device or destination application such as a diskette 16, an user monitor 20, a printer 14, or a remote monitor 26. Operator interaction with the system is facilitated by use of a keyboard 22 or a mouse 24. Of course, the components shown in FIG. 1 are merely exemplary rather than all inclusive of the many equivalent devices known by those skilled in the art. For instance, the image signal source could include any device which acts as an image signal source such as an electronic camera, a scanner, a camcorder, a charge coupled device, a charge injected device, etc. Also, it is noteworthy that the processing of the image need not necessarily occur solely in the computer 18. Indeed, various phases or aspects of the image processing could occur in the image signal source, the computer, or the destination output device.

1. DCT Mathematics

This section sets forth certain fundamental concepts relating to forward and inverse discrete cosine transforms.

An image is typically made up of a two-dimensional PxQ array of descriptors called pixels or image data points, where P is the number of rows and Q is the number of columns representing the image. The image can be represented by either image data points in the spatial domain, or by corresponding DCT coefficients in the frequency domain. A forward DCT generates the DCT coefficients by taking a discrete even cosine transformation (DECT abbreviated as DCT) of the image data points. Conversely, an inverse discrete even cosine transformation (IDECT abbreviated as IDCT) generates the IDCT coefficients (i.e. reconstructed image data points) by taking an inverse discrete cosine transformation of the DCT coefficients.

A DCT transformation can occur in any number of dimensions as understood by those skilled in the art. In the following one-dimensional example, a row (more generically referred to as a segment) of N image data points s(j) can be transformed from the spatial domain to corresponding DCT coefficients S(v) in the frequency domain in accordance with equation (1).

$$S(v) = C_v \sqrt{\frac{2}{N}} \sum_{j=0}^{N-1} s(j) \cos \frac{(2j+1)v\pi}{2N} \quad (1)$$

where:

$0 \leq v \leq (N-1)$, v an integer;

s(j) represents the matrix of image data points in the segment;

S(v) represents the corresponding matrix of DCT coefficients;

N represents the number of image data points in the segment;

$$C_v = \frac{1}{\sqrt{2}} \text{ for } v = 0;$$

and $$C_v = 1 \text{ for } v \neq 0.$$

The DCT coefficients S(v) are determined from equation (1) where the normalized cosine basis terms are derived for a segment having N image data points. The value for S(0) is determined for v=0 by summing each of the image data points s(j) for $0 \leq j < (N-1)$ times the cosine terms of the basis function. The value for S(1) is determined as the summation of image data points s(j) times the cosine terms for v=1. This procedure, which indexes first on v and then on j, is repeated for derivation of DCT coefficients S(0) through S(N-1).

A modified inverse discrete cosine transformation is mathematically defined in equation (2) where the one-dimensional matrix S(v) of DCT coefficients is transformed to a reconstructed matrix ŝ(y) of reconstructed image data points, and y is defined as a real number within the given range as disclosed and explained in parent application '795.

$$\hat{s}(y) = \sqrt{\frac{2}{N}} \sum_{v=0}^{N-1} C_v S(v) \cos \frac{(2y+1)v\pi}{2N} \quad (2)$$

where:

$0 \leq y \leq (N-1)$, y a real number;

S(v) represents the matrix of DCT coefficients;

ŝ(y) represents the spatial matrix of reconstructed image data points;

N represents the number of image data points in the segment;

$$C_v = \frac{1}{\sqrt{2}} \text{ for } v = 0;$$

and $$C_v = 1 \text{ for } v \neq 0.$$

If the DCT coefficients S(v) of equation (1) are computed from a set of image data points s(j) and the reconstructed image data points ŝ(y) of equation (2) are computed from the corresponding DCT coefficients S(v), then s(j)≡ŝ(y) when y=j, and the process is referred to as invertible or one-to-one mapping since the reconstructed image data points of ŝ(y) are identical, within limits, to the original image data points of s(j). By evaluating y in equation (2) at other (non-integer) values where $0 \leq y \leq (N-1)$, a modified IDCT is obtained which can be used for various processes such as the interpolation of values falling between discrete image data points which represent an image.

In determining the values representing the reconstructed image data points ŝ(y) using equation (2), ŝ(0) is determined by summing each of the DCT coefficients S(v) times the cosine terms of the inverse basis function for y=0. For example, the value for ŝ(0.5) is determined as the summation of DCT coefficients S(v) times the cosine terms for y=0.5. This procedure, which indexes first on y then on v, is repeated for derivation of all desired reconstructed image data points ŝ(y) where $0 \leq y \leq (N-1)$.

As earlier noted, the above mathematics can be readily expanded to multiple dimensions as known by one of ordinary skill in the art. For instance, an image can be represented in the spatial domain in two-dimensional format as described in parent application '795, where s(y,x) represents the image data points at real values y and x in the spatial domain, S(v,u) represents the corresponding DCT coefficients in the frequency domain, x ranges from 0 to (P-1), y ranges from 0 to (Q-1), P represents the total number of rows, and Q represents the total number of columns. The image data points s(y,x) may represent, but are not limited to, parameters such as brightness, luminance, color or hue.

Both equations (1) and (2) can alternatively be expressed in matrix notation. The matrix notation (without indices) for equation (1) is:

$$S = FB \cdot s \quad (3)$$

where S represents the matrix of DCT coefficients, s represents the matrix of image data points in the spatial domain, and FB represents the forward DCT basis matrix. The matrix notation for equation (2) is:

$$\hat{s} = IB \cdot S \quad (4)$$

where ŝ represents the spatial matrix of reconstructed image data points, and IB represents the inverse DCT basis matrix for the desired output points (i.e. reconstructed image data points). Combining matrix equations (3) and (4) will reduce the number of arithmetic operations as opposed to performing the matrix algebra in two different steps as previously described. Combining matrix equations (3) and (4) yields:

$$\hat{s} = IB \cdot (FB \cdot s) \quad (5)$$
$$= MB \cdot s$$

where MB is a combined DCT basis matrix derived from matrix multiplication of the inverse DCT basis matrix IB times the forward DCT basis matrix FB. The combined DCT basis matrix MB can be contemporaneously calculated while solving equation (5), or MB can be precalculated and stored in a look-up table.

2. Resampling Hardware

Figure 2A:
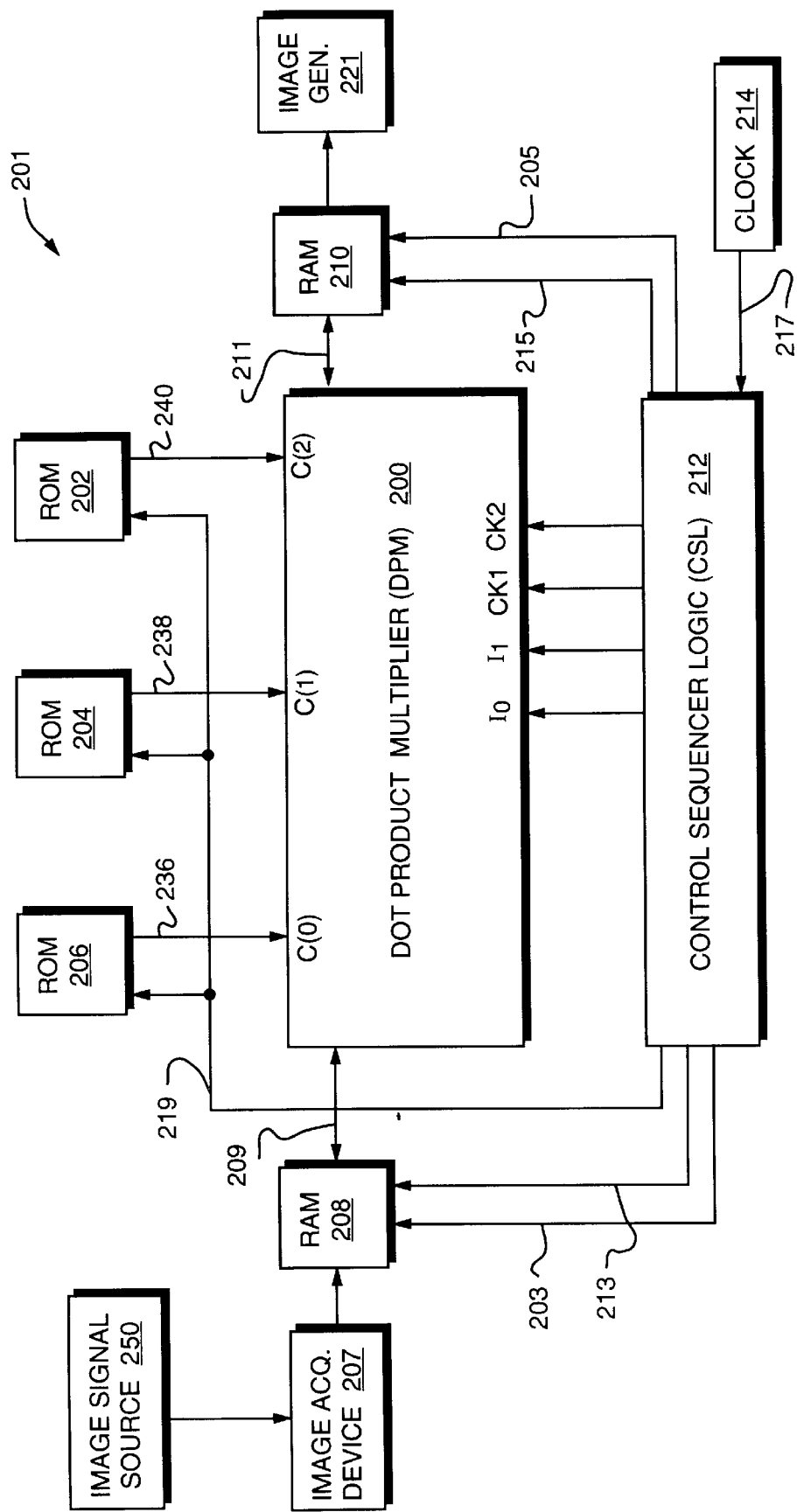
FIG. 2A is a detailed block diagram of the electronic imaging system of FIG. 1.

The preferred embodiment of an image processing system for resampling an image as shown in FIG. 2A includes: an image acquisition device 207; a dot product multiplier (DPM) 200; random access memories RAM 208 and RAM 210; coefficient read only memories ROM 202, ROM 204, and ROM 206; master clock 214; control sequencer logic (CSL) 212; and image generator 221. The master clock 214 produces a master clock signal 217 which is used by the control sequencer logic 212 to generate clock signals CK1 and CK2. The image acquisition device 207 could be any hardware for acquiring an image from the source 250, such as an input port, an A/D converter, etc. Similarly, the image generator 221 could be any device or system for generating an image from the coefficients stored in RAMs 208 or 210, such as a printer, cathode ray tube, etc. The overall hardware configuration is general purpose for versatility of use in a variety of matrix product multiplications.

The sample rate converter 201 provides: the DPM 200 as a fixed point arithmetic processor capable of computing the dot product of a (1×3) vector times a (3×1) vector in one clock cycle; RAM 208 and RAM 210 as random access memories for storing and buffering input data and processed data; ROM 202, ROM 204, and ROM 206 for storing precomputed modified IDCT basis matrix coefficients; and control sequencer logic 212 for handling the control and timing of the memories and the DPM 200.

Figure 2B:
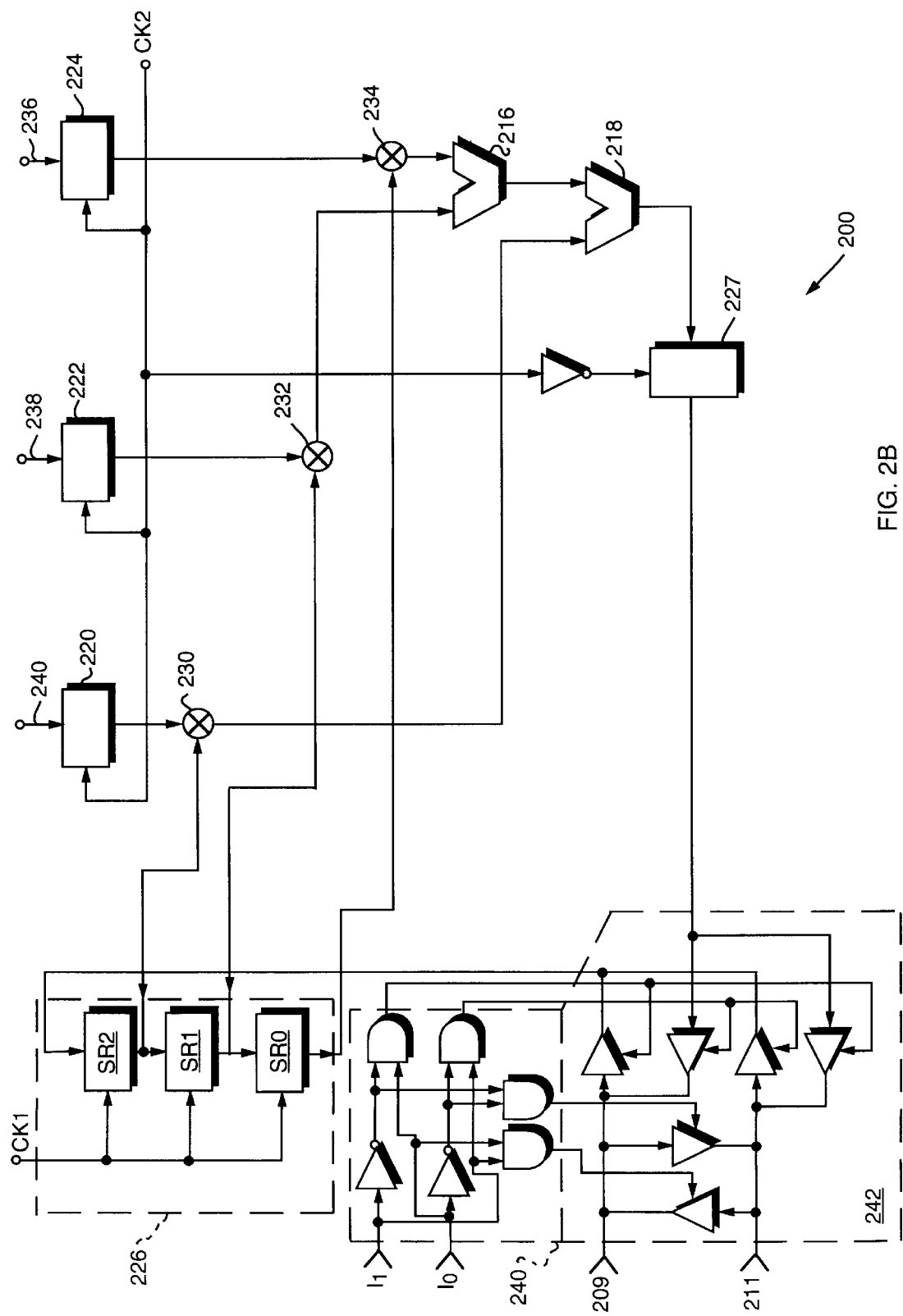
FIG. 2B is a logic diagram of the dot product multiplier array 200 of FIG. 2A.

The DPM 200 shown in detail in FIG. 2B is a three fixed-point multiplier array, with two on board adders 216 and 218, input latches 220, 222, 224, output latch 227, data shift register 226, bus transmitting logic 242 which controls the direction of transmission of data along bi-directional buses 209 and 211; and control logic 240. The bi-directional buses 209 and 211 allow the overlapping of memory accesses and, they are particularly advantageous if more than one pass through the DPM 200 is required. The buses 209 and 211 are configurable to transmit data directly between RAM 208 and RAM 210 in pass through mode, or to transmit data to the dot product multiplier for processing in process mode according to Truth Table I which defines the functions of data buses 209 and 211 as controlled by signals $I_0$ and $I_1$. For the following example, all the DCT coefficient data is predetermined and stored in RAM 208, is input through data bus 209, is processed in the DPM 200, then is transferred to RAM 210 through data bus 211. However, the bi-directional data buses 209, 211 provide versatility to the DPM so that other operations not specifically described herein but clearly recognizable by those skilled in the art (such as determination of DCT coefficients from spatial domain image data points) can be executed.

The predetermined DCT coefficients for a three-point sample segment are stored in registers SR0, SR1, and SR2 of shift register 226, and the values of the predetermined modified basis vector $IB_{mod}$ are stored in latches 220, 222 and 224, respectively. Multipliers 230, 232 and 234 form the products, respectively, of the data stored in the input latches 220, 222, 224 times the data stored in the registers SR2, SR1, SR0. The adder 216 produces the summation of the products of multipliers 232 and 234. The summation of adder 216 is then added to the product of multiplier 230 to produce the final dot product which is stored in output latch 227 for stabilizing the data on the selected output bus 209 or 211 during the following CK2 clock cycle.

The control sequencer logic 212 controls the addressing of the memories, controls data bus functions and generates appropriate timing signals for the DPM 200. Specifically, the control sequencer logic 212 provides: address data 203 to RAM 208; address data 205 to RAM 210; a read/write (R/$\overline{W}$) control signal 213 to RAM 208; a read/write control signal 215 to RAM 210; a clock signal CK1 to shift register 226; a clock signal CK2 to latches 220, 222, 224, 226; signals $I_0$ and $I_1$ for bus directional control; and address data 219 to ROMs 202, 204 and 206. The control sequencer logic 212 can easily be implemented with a microcontroller or programmable logic array (not shown). The choice is application dependent. The microcontroller is generally more flexible from a programming standpoint but somewhat higher in cost than a programmable logic array.

Figure 2C:
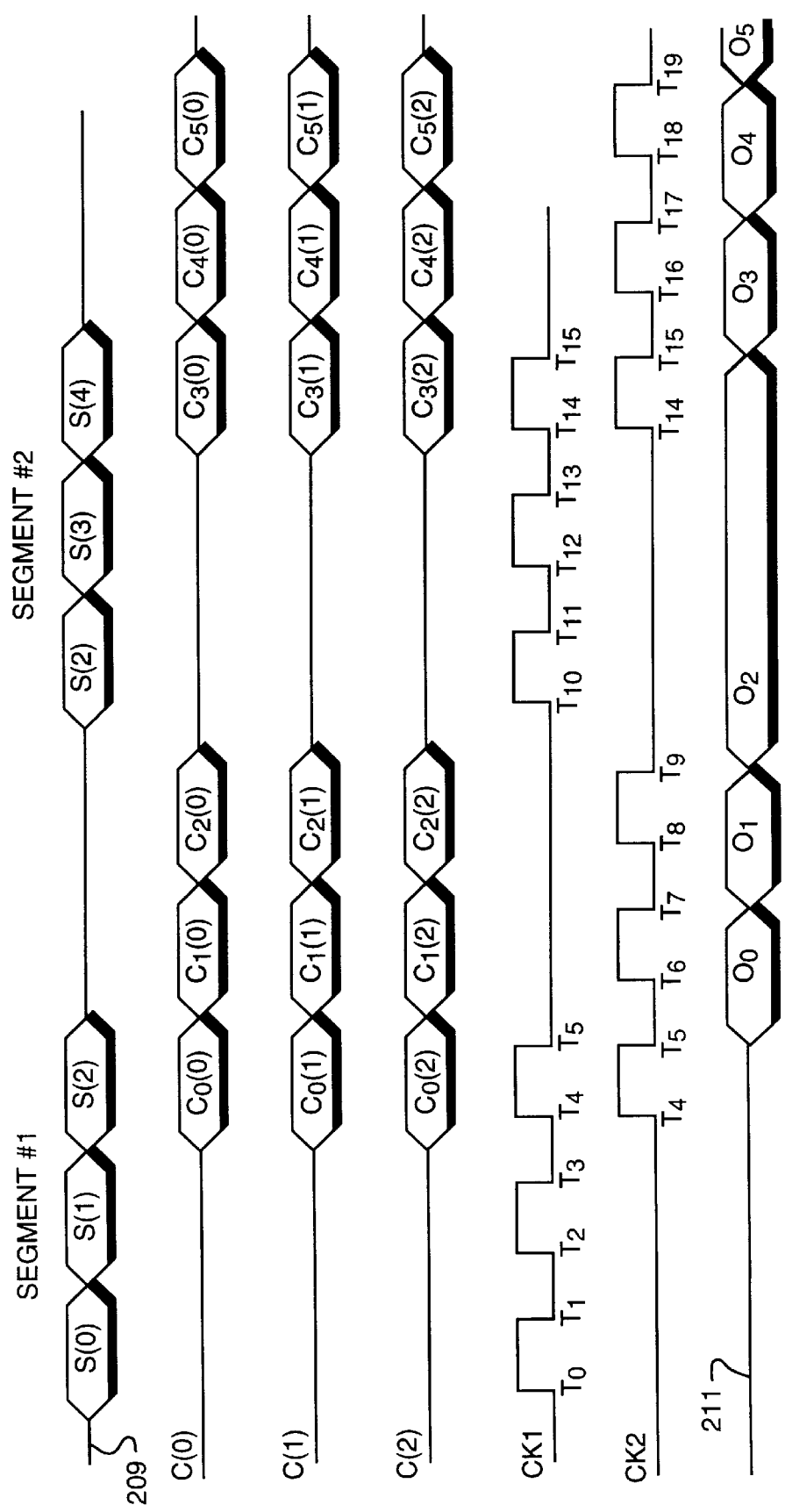
FIGS. 2C and 2D are contiguous timing diagrams of signals used and generated by the sample rate converter of FIG. 2A.
Figure 2D:
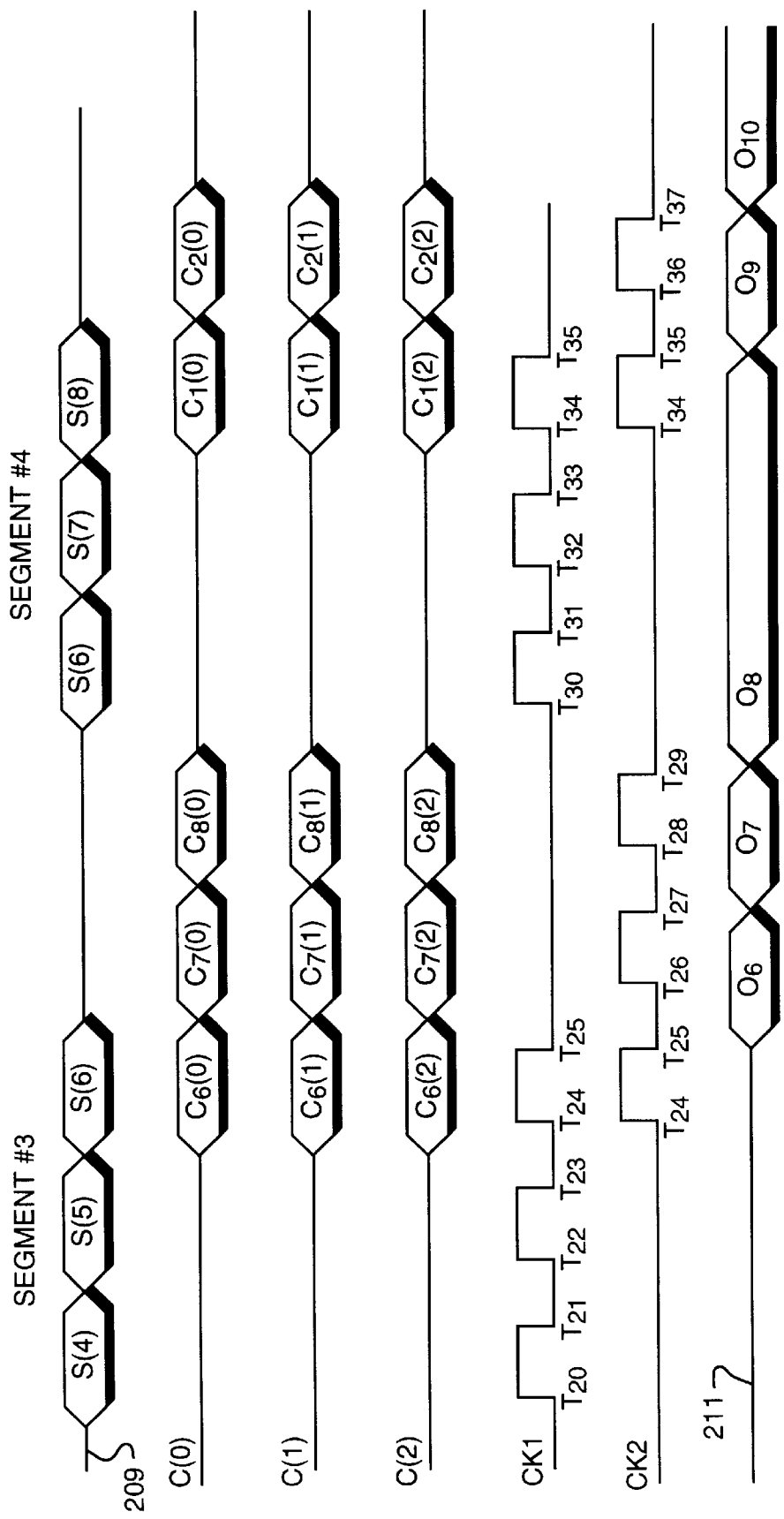

FIGS. 2C and 2D illustrate the timing relationships of numerous signals within the dot product multiplier 200 for an example using the hardware of FIGS. 2A and 2B to process a row of eight DCT data points S(0), S(1), S(2), S(3), S(4), S(5), S(6), S(7). In this example, the resampling ratio $\delta$ is set equal to 4/3 which results in upsampling as previously described. Three-point DCT processing according to equation (9) using a one-point overlap to ensure resampling continuity is used for the example although the number of data points for processing is variable. Generally speaking, processing more data points per sample provides more accurate results but requires more processing time whereas processing fewer data points per sample provides less accurate results requiring less processing time. It has been empirically determined that three and four point samples provide the best tradeoff between processing time and accuracy. For the current example the row of eight DCT data points will be divided into four three-point segments, i.e. N=3 in equation (9), resulting in {S(0), S(1), S(2)}, {S(2), S(3), S(4)}, {S(4), S(5), S(6)} and {S(6), S(7), S(8)}. As earlier noted, the access of memory addresses is controlled by the control sequencer logic 212.

The DCT data is originally stored in RAM 208 and transferred in segments to the DPM 200 via bus 209. The three DCT coefficients S(0), S(1), S(2) of segment #1 are read from RAM 208 and transferred into registers SR0, SR1, and SR2, respectively, of shift register 226 on the rising edge of CK1 at times $T_0$, $T_2$ and $T_4$. For the sake of simplicity the timing diagram does not show the master clock signal 217, the read write signals 213, 215, the bus directional signals $I_0$ and $I_1$, or the address signals 203, 205 and 219. On the rising edge of CK2 at time $T_4$ the modified vector of IDCT basis coefficients $C_0(0)$, $C_0(1)$, $C_0(2)$ is transferred via lines 236, 238, 240 to input latches 224, 222, and 220 from ROMs 206, 204, and 202, respectively. At time $T_5$ multiplier 234 generates the product $C_0(0)*S(0)$, multiplier 272 generates the product $C_0(1)*S(0)$, and multiplier 230 generates the product $C_0(2)*S(0)$. The adder 216 produces the summation of the products of multipliers 232 and 234. The summation of adder 216 is then added to the product of multiplier 230 to produce the final dot product $O_0$ which is temporarily stored in output buffer 227. After the falling edge of CK2 at time $T_5$, the dot product $O_0$ is transferred from the output buffer 227, through the bus transmitting logic 228, to RAM 210 via bus 211.

On the rising edge of CK2 at time $T_6$ the modified vector of IDCT basis coefficients $C_1(0)$, $C_1(1)$, $C_1(2)$ is transferred via lines 236, 238, 240 to input latches 224, 222, and 220 from ROMs 206, 204, and 202, respectively. At time $T_7$ multiplier 234 generates the product $C_1(0)*S(1)$, multiplier 232 generates the product $C_1(1)*S(1)$, and multiplier 230 generates the product $C_1(2)*S(1)$. The adder 216 produces the summation of the products of multipliers 232 and 234. The summation of adder 216 is then added to the product of multiplier 230 to produce the final dot product $O_1$ which is temporarily stored in output buffer 227. After the falling edge of CK2 at time $T_7$, the dot product $O_1$ is transferred from the output buffer 227, through the bus transmitting logic 228, to RAM 210 via bus 211.

On the rising edge of CK2 at time $T_8$ the modified vector of IDCT basis coefficients $C_2(0)$, $C_2(1)$, $C_2(2)$ is transferred via lines 236, 238, 240 to input latches 224, 222, and 220 from ROMs 206, 204, and 202, respectively. At time $T_9$ multiplier 234 generates the product $C_2(0)*S(2)$, multiplier 232 generates the product $C_2(1)*S(2)$, and multiplier 230 generates the product $C_2(2)*S(2)$. The adder 216 produces the summation of the products of multipliers 232 and 234. The summation of adder 216 is then added to the product of multiplier 230 to produce the final dot product $O_2$ which is temporarily stored in output buffer 227. After the falling edge of CK2 at time $T_9$, the dot product $O_2$ is transferred from the output buffer 227, through the bus transmitting logic 228, to RAM 210 via bus 211.

Figure 2E:
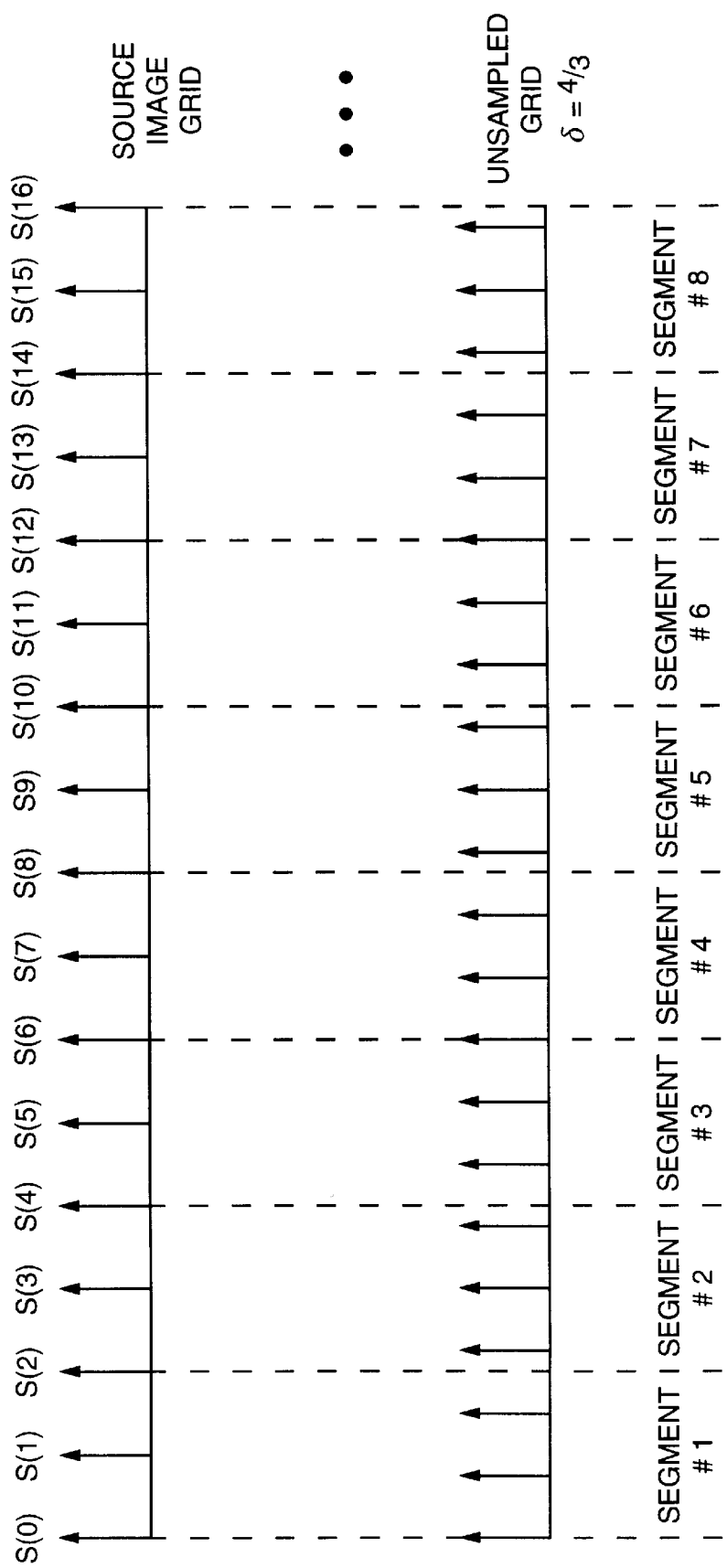
FIG. 2E is a diagram showing the correlation between sampled image data points in an input image and upsampled image data points for a resampling rate of 4/3.

If the segment size is extended then the processing sequence for upsampling by 4/3 will follow the pattern shown in FIG. 2E. Specifically, the first segment uses vector coefficients $C_0$, $C_1$, $C_2$; the second segment uses vector coefficients $C_3$, $C_4$, $C_5$; the third segment uses vector coefficients $C_6$, $C_7$, $C_8$; the fourth segment uses vector coefficients $C_1$, $C_2$; the fifth segment uses vector coefficients $C_3$, $C_4$, $C_5$; the sixth segment uses vector coefficients $C_6$, $C_7$, $C_8$; the seventh segment uses vector coefficients $C_1$, $C_2$; the eighth segment uses vector coefficients $C_3$, $C_4$, $C_5$; etc.

The above described process is repeated for each row of the image. Thus only nine coefficient vectors need to be stored to horizontally process the image of the current example. When all the rows have been processed, then the image has been upsampled in the horizontal direction. The above described hardware is equally applicable for resampling the image in the vertical direction using the same resampling ratio of δ=4/3. The modified DCT basis vectors for the vertical resampling are the same as those used for the horizontal resampling above, however, the DCT coefficient vectors for each segment must be taken along the columns instead of the rows of the image.

3. Sample Rate Conversion Methodology

The task of sample rate conversion arises frequently in signal processing and image processing applications. In the case of photo imaging, the samples are represented as pixels, which are also referred to as image data points.

Common approaches to sample rate conversion are dependent upon whether upsampling, i.e. sampling at a faster rate, or downsampling, i.e. sampling at a slower rate, is desired. When downsampling by an integer factor, a low pass filter for anti-aliasing is typically used and is followed by decimation. Upsampling by an integer factor is usually performed by either inserting zeros between samples and then low pass filtering, or using an equivalent polyphase approach. Zero-order-hold and linear interpolation are special cases of the upsampling approach using particular low pass filters. When the sample rate conversion uses a rational factor, a combination of upsampling and downsampling is often used. Furthermore, sample rate conversion using a non-rational factor is frequently not implemented due to the complexities of the algorithm.

The system for sample rate conversion of an image using discrete cosine transforms according to the present invention is operational for both upsampling and downsampling, using integer, rational or irrational sampling rate conversion ratios. Furthermore, a conventional polyphase approach may require generating many different filters for the purpose of upsampling, depending on the upsampling rate. The DCT approach, on the other hand, obviates the need for generating many different filters.

Figure 3A:
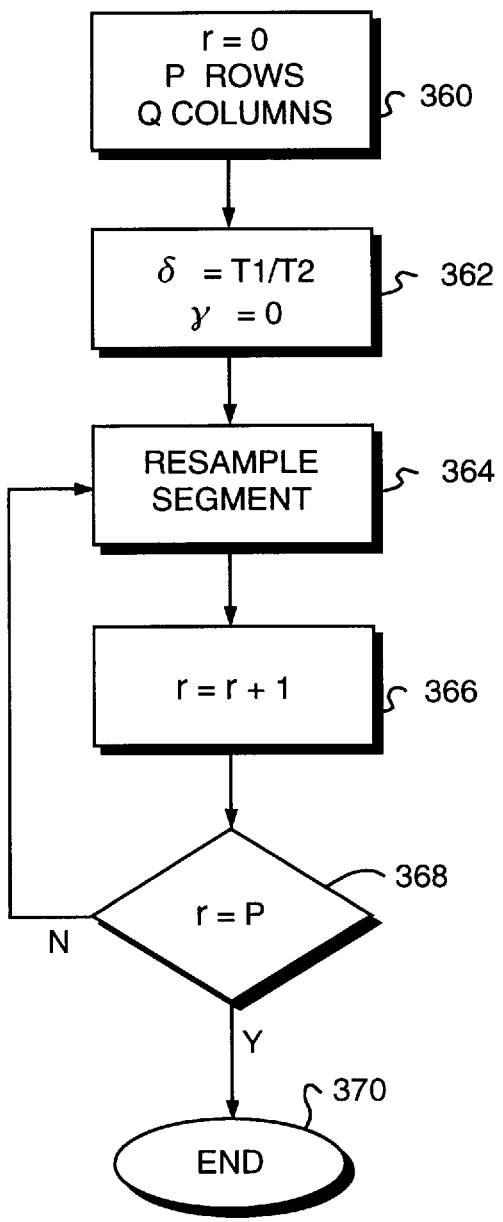
FIG. 3A is a flowchart of a method, according to the invention, of resampling rows of an image in accordance with both a resampling rate conversion ratio $\delta$ and an offset $\gamma$.
Figure 4A:
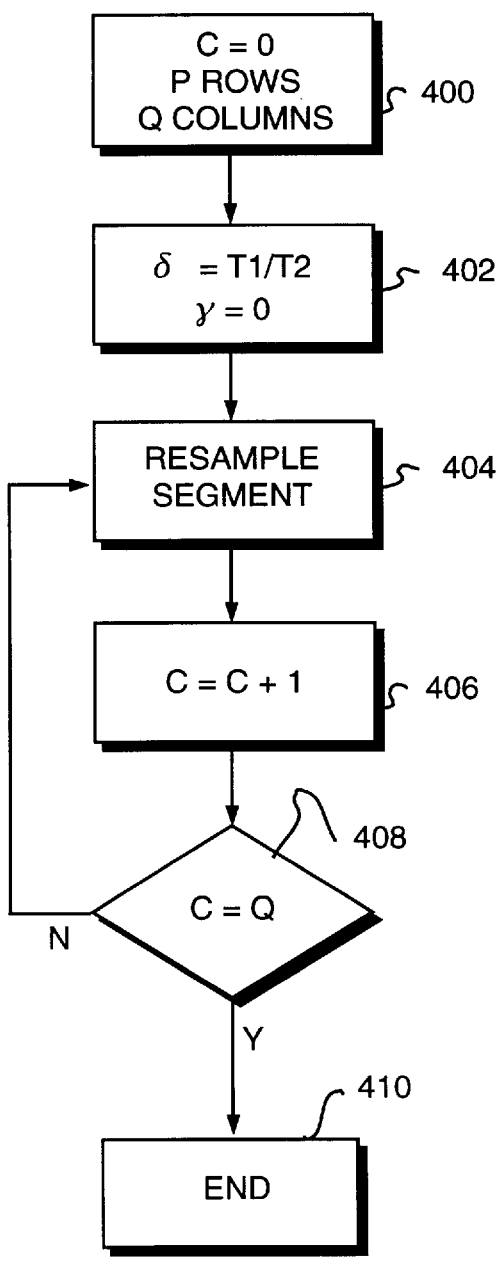
FIG. 4A is a flowchart of a method, according to the invention, of resampling columns of an image in accordance with both a resampling rate conversion ratio $\delta$ and an offset $\gamma$.

The image processing system of FIG. 2A is operational using a method for DCT based sample rate conversion of an image in the horizontal direction as shown in the flowchart of FIG. 3A. The system is also operational using a similar method for sample rate conversion in the vertical direction as shown in FIG. 4A.

In considering sample rate conversion in the horizontal direction, an image is represented in block 360 of FIG. 3A as a two-dimensional array s(j,i) of image data points having P rows and Q columns. A row index r is initialized to zero whereby the row index r corresponds to i and the column index c corresponds to j. Row r is represented as a one-dimensional array of pixels, s(j) for j=0, 1, 2 . . . (Q−1), where s(j) is a discrete representation of a continuous one-dimensional signal $s_c(y)$ sampled at $y=jT_1$, j is an integer index as given above, and $T_1$ defines the horizontal sampling period. In block 362 the desired sampling rate conversion ratio δ is set to the ratio of the original sampling period $T_1$ to the desired sampling period $T_2$, and an offset γ is set to zero.

Due to the invertibility of the DCT, the modified IDCT equation (2) can be rewritten by making the substitution of $y=(yT_1)/T_1$ and evaluating for integer values of y in equation (6) as follows:

$$s(j) \;=\; s_1(y)|_{y=j} = s_c(y)|_{y=jT_1} \qquad (6)$$

$$= \sqrt{\frac{2}{N}} \sum_{v=0}^{N-1} C_v S(v) \cos \frac{v\pi}{2N} \left( \frac{2jT_1}{T_1} + 1 \right)$$

where for j=0, 1, 2, . . . (N−1), $s_c(y)|_{y=jT_1}$ is given by equation (6) above. The waveforms of equation (6) are shown in FIGS. 5A–5E. The desired samples of $s_c(y)$ after resampling occur at $y=jT_2$ so that:

$$s_c(y)|_{y=jT_2} = \sqrt{\frac{2}{N}} \sum_{v=0}^{N-1} C_v S(v) \cos \frac{v\pi}{2N} \left( \frac{2jT_2}{T_1} + 1 \right) \qquad (7)$$

It follows that:

$$s_2(y)|_{y=j} \;=\; s_1(y)|_{y=j/\delta} = s_c(y)|_{y=jT_2} \qquad (8)$$

$$= \sqrt{\frac{2}{N}} \sum_{v=0}^{N-1} C_v S(v) \cos \frac{v\pi}{2N} \left( \frac{2j}{\delta} + 1 \right)$$

Figure 5A:
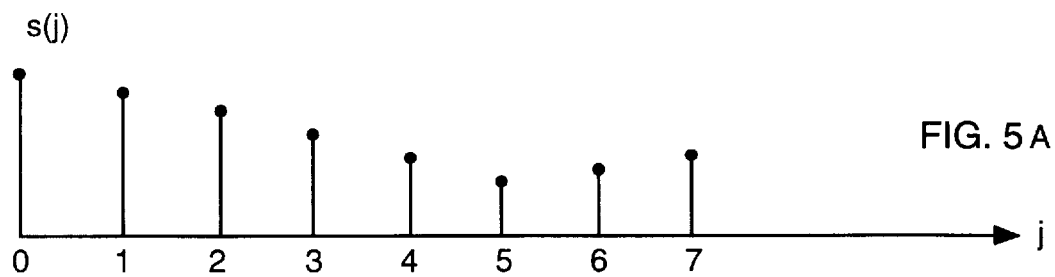
FIG. 5A is a graph of a one-dimensional signal s(j) to be resampled according to the resampling method of FIG. 3A or 4A, whereby s(j) is plotted with respect to a sampling period $T_1$.
Figure 5B:
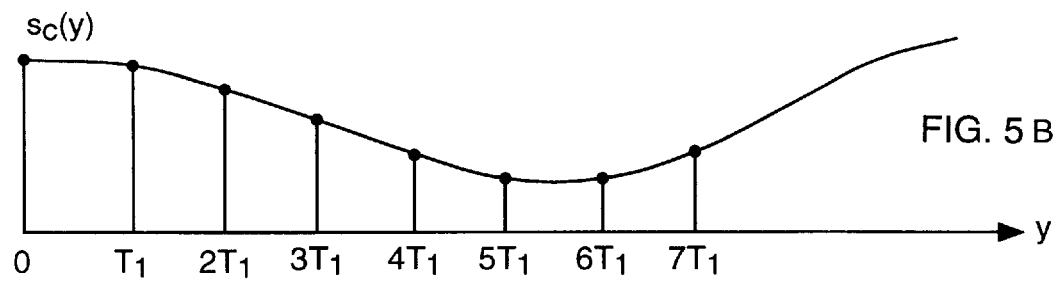
FIG. 5B is a graph of a one-dimensional signal $s_c(y)$, which is a continuous representation of the discrete signal s(j) of FIG. 5A, whereby samples of $s_c(y)$ at a period of $T_1$ correspond to the samples of s(j)
Figure 5C:
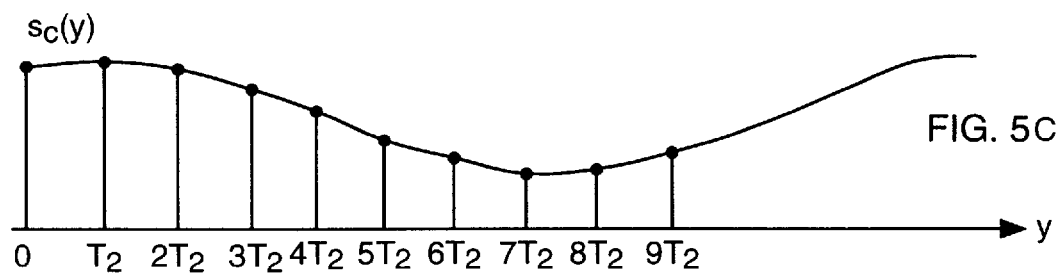
FIG. 5C is a graph of the same continuous signal $s_c(y)$ of FIG. 5B, whereby the samples are indicated at a period of $T_2$.
Figure 5D:
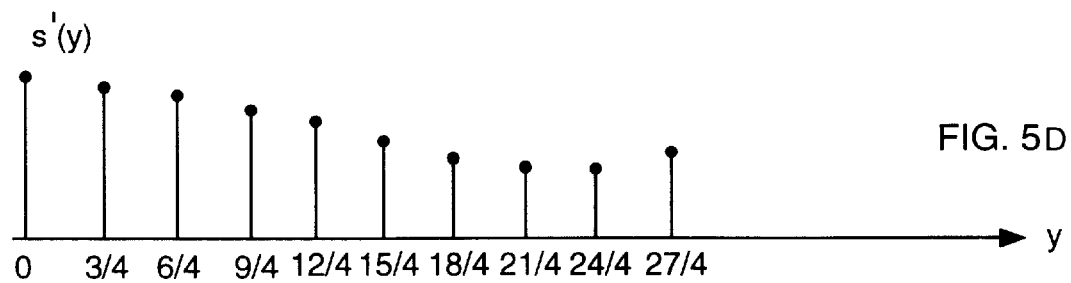
FIG. 5D is a graph of the discrete time signal $s_1(y)$ obtained by sampling $s_c(y)$ at a sampling period of $T_2$, whereby the real index of $s_1(y)$ indicates the temporal relationship to the samples of s(j) in FIG. 5A.
Figure 5E:
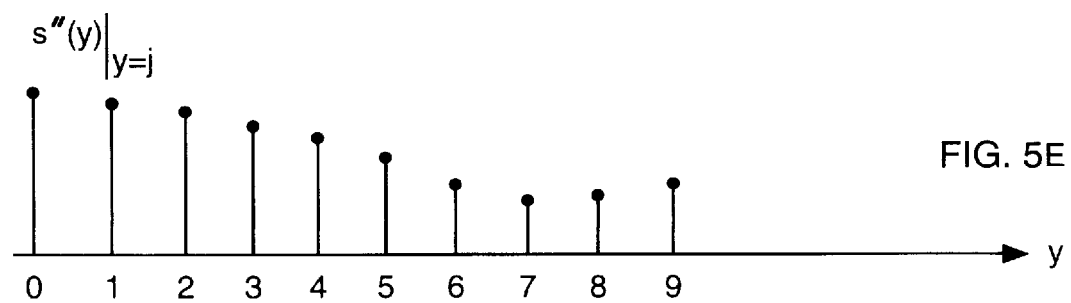
FIG. 5E is a graph of a discrete time signal $s_2(y)$ with integer indices whose samples are the same as $s_1(y)$.

In equation (8), j is valid for integer values $0 \leq j \leq (N-1)\delta$ and the output signal $s_2(j)$ in FIG. 5E is an upsampled (i.e. δ>1) version of the input signal s(j) where the sampling rate conversion ratio δ=4/3.

Figure 3B:
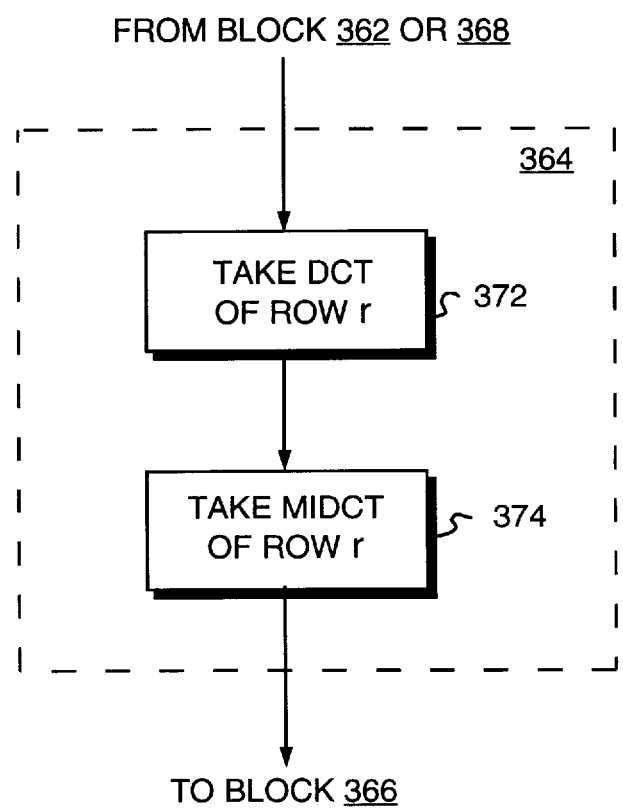
FIG. 3B is a block diagram of the steps of block 364 of FIG. 3A, whereby the segment includes all the image data points in a row.
Figure 3C:
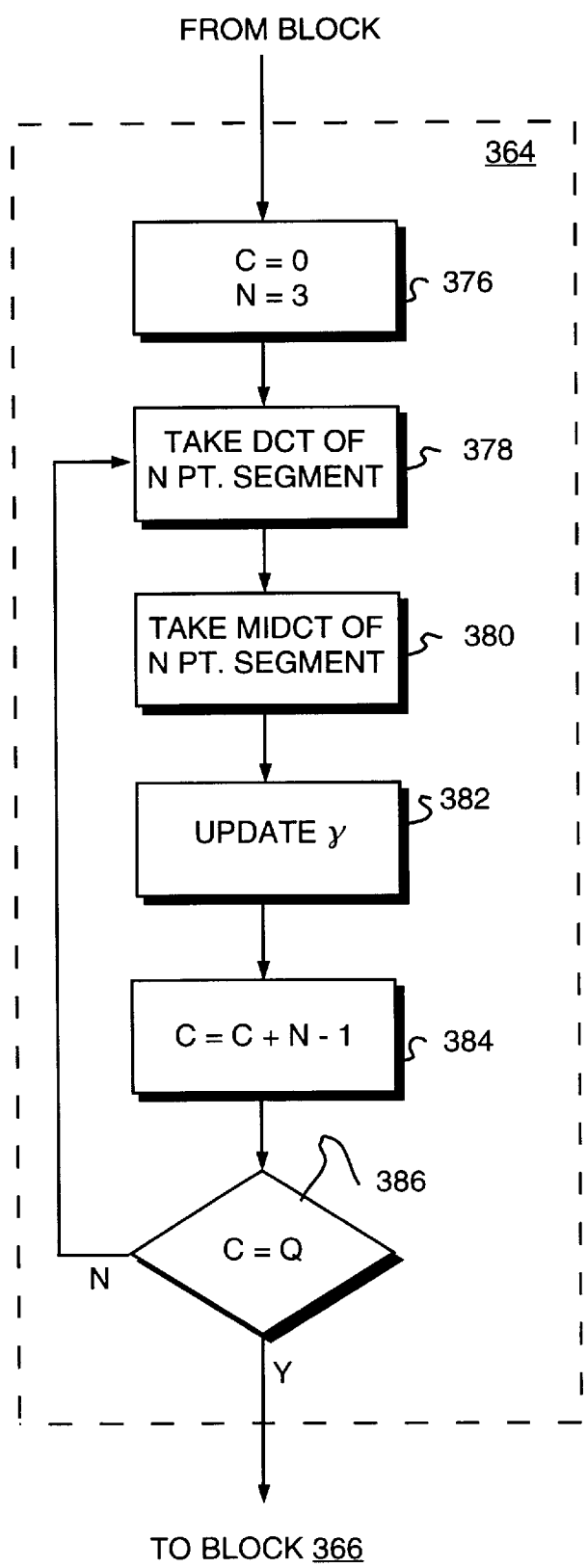
FIG. 3C is a block diagram of the steps of block 364 of FIG. 3A, whereby the segment includes less than the total number of image data points in a row.

In block 364 each pixel of row r of the image is upsampled. This is done, according to the steps of FIG. 3B, when using the row length as the segment size for DCT processing in equation (1), although a preferred method is implemented as shown in FIG. 3C by segmenting each line into smaller, overlapping segments of size N. One successful choice for segmentation is to use three-point segments (i.e. N=3 in equation (1) and in FIG. 3C) which overlap by one-point. If the segmentation is done in this way, then the first segment of s(j) includes the image data points {s(0), s(1), s(2)}; the second segment of s(j) includes the image data points {s(2), s(3), s(3)}; and the third segment of s(j) includes the image data points {s(4), s(5), s(6)}. These segments correspond to samples of the continuous signal $s_c(y)$, that is: {s(0), s(1), s(2)}={$s_c(0T_1)$, $s_c(1T_1)$, $s_c(2T_1)$}; {s(2), s(3), s(4)}={$s_c(2T_1)$, $s_c(3T_1)$, $s_c(4T_1)$}; and {s(4), s(5), s(6)}={$s_c(4T_1)$, $s_c(5T_1)$, $s_c(6T_1)$}.

In block 376 of FIG. 3C, the column index c is set to zero and the segment size N is set to 3. In block 378, DCT coefficients are calculated when performing a discrete cosine transformation on the first three-point segment. In block 380, the modified IDCT is performed on the DCT coefficients of block 378 to determine the output signal $s_2(y)$. Proper correspondence between the input signal s(j) and the output signal $s_2(y)$ must be maintained so that when image data points are reconstructed from the DCT coefficients the output signal is not distorted. To sustain the proper correspondence, the segment boundaries of s(j) in the underlying continuous signal $s_c(y)$ must be consistently maintained in $s_1(y)$ and $s_2(y)$. In other words, the segment boundaries located in s(j) at j={0, 2, 4, 6} should correspond to the points in $s_c(y)$ where y={0, $2T_1$, $4T_1$, $6T_1$}={0 $2\delta T_2$, $4\delta T_2$, $6\delta T_2$} or alternatively correspond to the points in $s_2(y)$ where y={0, 2δ, 4δ, 6δ}. Therefore, when interpolating the signal for a given segment, it is useful to rewrite equation (8) into equation (9) as:

$$s_1(y)|_{y=j+\gamma} = \sqrt{\frac{2}{N}} \sum_{v=0}^{N-1} C_v S(v) \cos \frac{v\pi}{2N} \left( \frac{2(j+\gamma)}{\delta} + 1 \right) \qquad (9)$$

where γ is the offset of the first reconstructed image data point in a segment from the beginning of the segment boundary. The offset γ is updated in block 382 and can be readily determined for the $k^{th}$ segment, since the $(k-1)^{th}$ segment ends at $s_1((k-1)(N-1)\delta)$, which is precisely where the kth segment starts. Therefore, the values of $s_1(j)$ for j an integer in the range $0 \leq j \leq (k-1)(N-1)\delta$ all are reconstructed in the first (k−1) segments, and the first point to be reconstructed in the $k^{th}$ segment is $s_1(j_k)$ where $j_k$ is the smallest integer greater than $(k-1)(N-1)\delta$ and $\gamma_k = j_k - (k-1)(N-1)\delta$. For the current example where δ=4/3 and N=3, the segment boundaries of the first three segments of $s_1(y)$ are located at y={0, 8/3, 16/3} where (N−1)δ=8/3. The first segment always starts at 0 and is treated as a special case with $\gamma_1=1$. The smallest integers greater than the two non-zero boundary points are located at y={3,6}, yielding offset values of $\gamma_2=\frac{1}{3}$ and $\gamma_3=\frac{2}{3}$, i.e., $$\gamma_k = j_k - (k-1)(N-1)\delta$$

$$j_k = \lceil (k-1)(N-1)\delta \rceil$$

thus, $$\gamma_2 = \lceil (2-1)(3-1)4/3 \rceil - (2-1)(3-1)4/3 = \frac{1}{3}.$$

Each pixel of row r is processed by incrementing the column index c in block 384 in a manner which facilitates a three-point segment having a one-point overlap. If the column number c equals the total number of columns Q in decision box 386, then the process exits the segment resampling block 364, otherwise another segment is processed in blocks 378–386 for the incremented value of c until every pixel in row r has been processed.

The row index r is incremented in block 366 then tested against the number of rows P of the image in block 368. If r=P then the image has been completely resampled and the resampling process ends in block 370. However, if r≠P then the incremented row of image data points is resampled in block 364 as previously described.

The above method for DCT based sample rate conversion of an image can be applied in the vertical direction according to the flowchart of FIG. 4A. In considering sample rate conversion in the vertical direction, an image is represented in block 400 in FIG. 4A as a two-dimensional array s(j,i) of image data points having P rows and Q columns. A row index r is initialized to zero whereby the row index r corresponds to i and the column index c corresponds to j. Row r is represented as a one-dimensional array of pixels, s(j) for j=0, 1, 2 . . . (Q−1), where s(j) is a discrete representation of a continuous one-dimensional signal $s_c(y)$ sampled at $y=jT_1$, j is an integer index as given above, and $T_1$ defines the horizontal sampling period. In block 402 the desired sampling rate conversion ratio δ is set to the ratio of the original sampling period $T_1$ to the desired sampling period $T_2$, and an offset γ is set to zero. The above analysis with respect to equations (6), (7) and (8) also applies here.

Figure 4B:
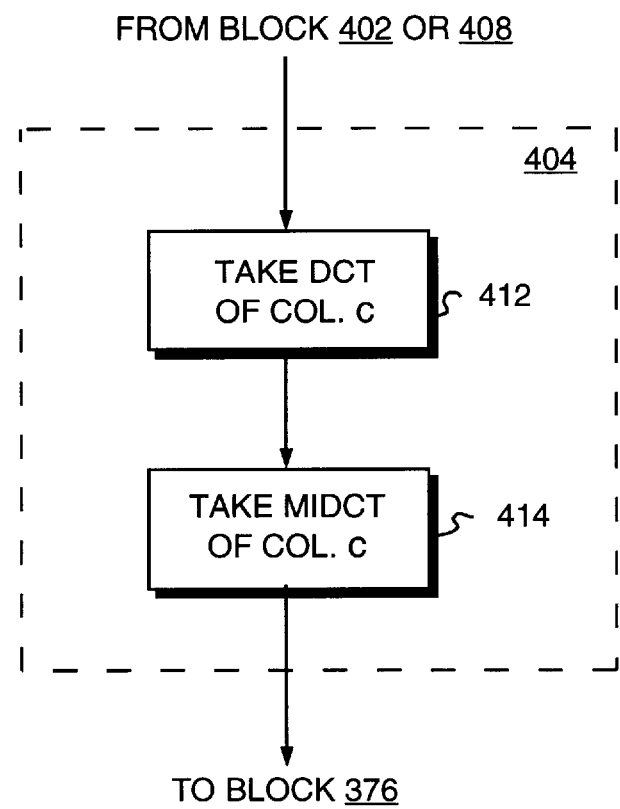
FIG. 4B is a block diagram of the steps of block 404 of FIG. 4A, whereby the segment includes all the image data points in a column.
Figure 4C:
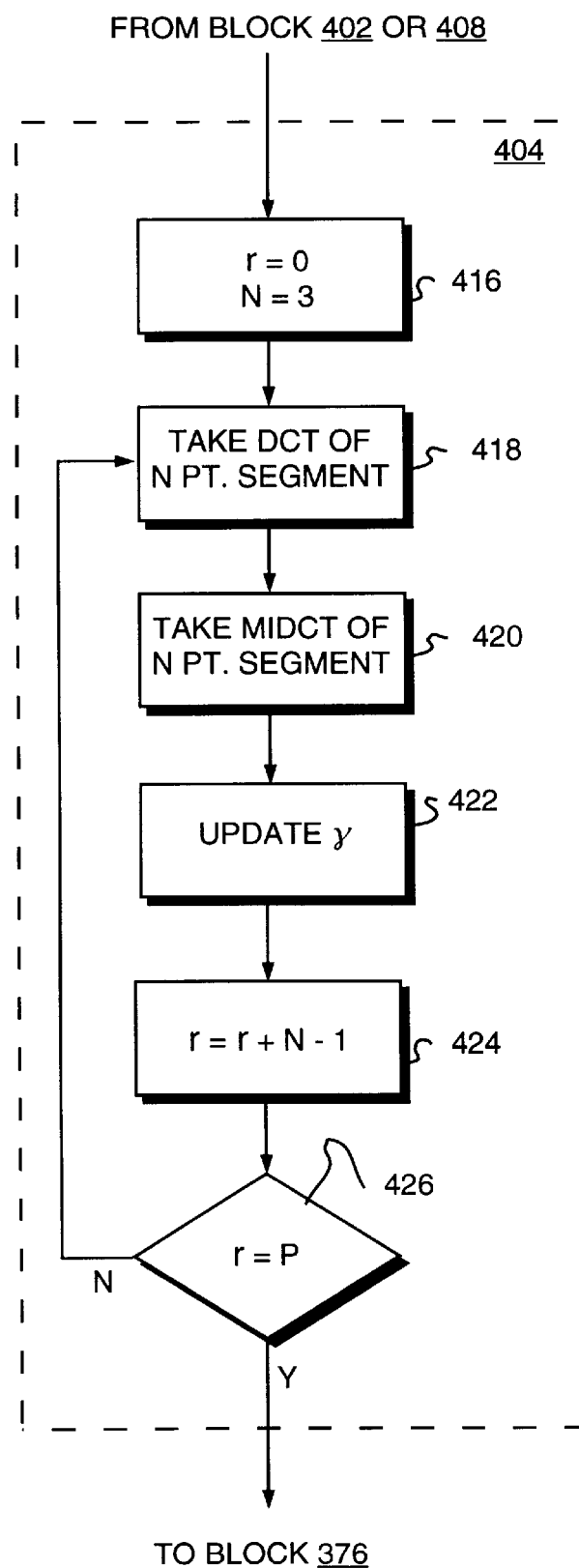
FIG. 4C is a block diagram of the steps of block 404 of FIG. 4A, whereby the segment includes less than the total number of image data points in a column.

In block 404 each pixel of each column of the image is upsampled. This is done, according to the steps of FIG. 4B, when using the column length as the segment size for DCT processing in equation (1), although a preferred method is implemented as shown in FIG. 4C by segmenting each line into smaller, overlapping segments of size N. As in the above example of sample rate conversion in the horizontal direction, the segment size in the example of FIG. 4C is chosen as N=3.

In block 416 of FIG. 4C, the row index r is set to zero and the segment size N is set to 3. In block 418, DCT coefficients are calculated when performing a discrete cosine transformation on the first three-point segment. In block 420, the modified IDCT is performed on the DCT coefficients of block 418 to determine the output signal $s_2(y)$. Proper correspondence between the input signal s(j) and the output signal $s_2(y)$ must be maintained as previously described so that when image data points are reconstructed from the DCT coefficients the output signal is not distorted.

The row index r is incremented in block 424 to facilitate a three-point segment having a one-point overlap. If the row number equals the total number of rows as decided in decision box 426, then the process exits the segment resampling block 404, otherwise another segment of row r is processed in blocks 418–426.

The above sample rate conversion methods are applicable for both upsampling when δ>1 as illustrated, and for downsampling when δ<1. It works equally well when the sampling rate conversion ratio δ is an integer, a rational number, or an irrational number. Furthermore, the mathematics of the inventive methods is simplified by the use of matrix algebra. For instance, the modified IDCT of equation (2) can be expressed for a three-point sample segment, i.e. N=3, as:

$$\hat{s}(y)|_{y=j+\gamma} = \left( \begin{array}{c} \sqrt{\frac{1}{N}} \\ \sqrt{\frac{2}{N}} \cos \frac{\pi}{N} \left( \frac{j+\gamma}{\delta} + \frac{1}{2} \right) \\ \sqrt{\frac{2}{N}} \cos \frac{2\pi}{N} \left( \frac{j+\gamma}{\delta} + \frac{1}{2} \right) \end{array} \right)^T \left( \begin{array}{c} S(0) \\ S(1) \\ S(2) \end{array} \right) \quad (10)$$

where each resampled point of the output signal $s_1(y)$ is determined from the inner product of (i) the transpose of the modified IDCT basis matrix with offset compensation, and (ii) the matrix of DCT coefficients.

Sample rate conversion can be expressed using matrices so that DCT equation (1) is expressed as S=FB·s and the modified IDCT of equation (10) is expressed as ŝ=IB·S. Thus, ŝ=IB·FB·s=MB·s where S represents the matrix of DCT coefficients, s represents the matrix of image data points in the spatial domain, FB represents the forward DCT basis matrix, IB represents the modified inverse DCT basis matrix, MB represents the combined modified basis matrix resulting from the product of the modified inverse DCT basis matrix times the forward DCT basis matrix, and ŝ represents the spatial matrix of reconstructed image data points.

Since a cosine argument may take on an arbitrary number of values, the cosines of the modified inverse DCT basis matrix IB or the combined modified basis matrix $MB_{mod}$ must be computed separately for each segment. In other words, the resampled image data points ŝ(y) which depend on δ and $\gamma_n$ in equation (20) must be either computed at run-time or precomputed, quantized and stored in look-up tables. The coarseness of the quantization can be specified at run-time, and an M×N table can be precomputed in order to warehouse the coefficients, thus requiring some overhead computation which is independent of the size of the image. M equals {(N−1)/Ψ}+1 where Ψ represents the accuracy with which the sampling locations of the output signal ŝ(y) can be specified. For example, if Ψ=0.01, then the true sampling locations of ŝ(y) will be at values of y=(j/δ) rounded to the nearest hundredth where j is an integer. In this case, the table size is determined as {(100(N−1)+1)×N}.

It is to be understood that the above described embodiments are merely illustrative of the present invention and represent a limited number of the possible specific embodiments that can provide applications of the principles of the invention. Numerous and varied other arrangements may be readily devised in accordance with these principles by those skilled in the art without departing from the spirit and scope of the invention as claimed.

We claim:

1. In image processing, a sample rate conversion system for one of upsampling and downsampling an electrical image signal representing an input image of pixels having a predetermined first sampling rate in a spatial domain, said system comprising:

means for acquiring the image signal from an image signal source;

means for initializing one of a column index and a row index corresponding to columns and rows, respectively, of said input image;

means for selecting a sampling rate conversion ratio δ defined as the first sampling rate divided by a predetermined second sampling rate;

means for generating DCT coefficients of a segment of said image signal related to said one of the column index and the row index by taking a discrete even cosine transformation (DCT) of said segment; and means for generating modified IDCT coefficients, related to said DCT coefficients, by taking a modified inverse discrete even cosine transform (IDCT) of said DCT coefficients of said segment using a modified IDCT basis matrix dependent upon both said sampling rate conversion ratio and an offset, said offset being dependent upon said sampling rate conversion ratio and said one of the column index and the row index, wherein said modified IDCT coefficients represent said one of the upsampled and downsampled image signal and wherein said modified IDCT is mathematically defined as:

$$\hat{s}(y)|_{y=j+\gamma} = \sqrt{2/N} \sum_{V=0}^{N-1} C_V S(v) \cos v\pi(2(j+\gamma)/\delta + 1)$$

where:

$0 \leq y \leq (N-1)$

N is a number of said pixels in said each segment;

V and y are integers;

S(v) represents the DCT coefficients;

ŝ(y) represents the modified IDCT coefficients;

δ is the sampling rate conversion ratio;

γ is the offset;

$C_v = 1/\sqrt{2}$ for v=0; and $C_v = 1$ for v≠0.

2. The sample rate conversion system of claim 1, further comprising means for incrementing said one of the column index and the row index until said modified IDCT coefficients are generated for every pixel of the input image.

3. The system of claim 2, further comprising means for generating an output image at said second sampling rate in response to said modified IDCT coefficients.

4. In image processing, a sample rate conversion method for one of upsampling and downsampling an image signal representing an input image of pixels having a predetermined first sampling rate in a spatial domain, said method comprising the steps of:

(a) initializing one of a column index and a row index corresponding to columns and rows, respectively, of said input image;

(b) selecting a sampling rate conversion ratio δ defined as the first sampling rate divided by a preselected second sampling rate;

(c) generating DCT coefficients of a segment of said image signal related to said one of the column index and the row index by taking a discrete even cosine transformation (DCT) of said segment; and (d) generating modified IDCT coefficients, related to said DCT coefficients, by taking a modified inverse discrete even cosine transform (IDCT) of said DCT coefficients of said segment using a modified IDCT basis matrix dependent upon both said sampling rate conversion ratio and an offset, said offset being dependent upon said sampling rate conversion ratio and said one of the column index and the row index, wherein said modified IDCT coefficients represent said one of the upsampled and downsampled image signal and wherein said modified IDCT is mathematically defined as:

$$\hat{s}(y)|_{y=j+\gamma} = \sqrt{\frac{2}{N}} \sum_{v=0}^{N-1} C_v S(v) \cos \frac{v\pi}{2N} \left( \frac{2(j+\gamma)}{\delta} + 1 \right)$$

where:

$0 \leq y \leq (N-1)$

N is a number of said pixels in said each segment;

v and y are integers;

S(v) represents the DCT coefficients,

ŝ(y) represents the modified IDCT coefficients;

δ is the sampling rate conversion ratio;

γ is the offset, $$C_v = \frac{1}{\sqrt{2}} \text{ for } v = 0;$$

and $C_v = 1$ for v≠0.

5. The sample rate conversion method of claim 4, further comprising the step of incrementing said one of the column index and the row index, then repeating steps (c) and (d) until said modified IDCT coefficients are generated for every pixel of the input image.

6. The sample rate conversion method of claim 5, further comprising the step of generating a resampled image from said modified IDCT coefficients.

7. In image processing, a sample rate conversion method for one of upsampling and downsampling pixels representing an input image in a spatial domain, said method comprising the steps of:

acquiring, from an image signal source, said input image of image data points having a first sampling period;

initializing one of a column index and a row index corresponding to columns and rows, respectively, of said input image;

selecting a sampling rate conversion ratio δ defined as the first sampling period divided by a preselected second sampling period;

generating DCT coefficients of a segment of said image signal related to said one of the column index and the row index by taking a discrete even cosine transformation (DCT) of said segment;

generating modified IDCT coefficients, related to said DCT coefficients, by taking a modified inverse discrete even cosine transform (IDCT) of said DCT coefficients of said segment using a modified IDCT basis matrix dependent upon both said sampling rate conversion ratio and an offset, said offset being dependent upon said sampling rate conversion ratio and said one of the column index and the row index, wherein said modified IDCT coefficients represent said one of upsampled and downsampled pixels and wherein said modified IDCT is mathematically defined as:

$$\hat{s}(y)|_{y=j+\gamma} = \sqrt{2/N} \sum_{v=0}^{N-1} C_v S(v) \cos v\pi(2(j+\gamma)/\delta + 1)$$

where:

$0 \leq y \leq (N-1)$;

N is a number of said pixels in said each segment;

V and y are integers; S(v) represents the DCT coefficients; ŝ(y) represents the modified IDCT coefficients;

δ is the sampling rate conversion ratio;

γ is the offset;

$C_v = 1/\sqrt{2}$ for v=0; and $C_v = 1$ for v≠0;

generating a reconstruction matrix for said segment by multiplying said DCT coefficients times said modified IDCT coefficients; and generating a resampled image by multiplying said reconstruction matrix times said image data points of said input image.

* * * * *